(12) United States Patent
Dyke et al.

(10) Patent No.: US 9,865,880 B2
(45) Date of Patent: Jan. 9, 2018

(54) COMPONENT INCLUDING A RECHARGEABLE BATTERY

(75) Inventors: Amy Elizabeth Dyke, South Gloucestershire (GB); Michael Dunleavy, South Gloucestershire (GB); Martyn John Hucker, South Gloucestershire (GB)

(73) Assignee: BAE SYSTEMS PLC, London (GB)

(*) Notice: Subject to any disclaimer, the term of this patent is extended or adjusted under 35 U.S.C. 154(b) by 846 days.

(21) Appl. No.: 14/126,087

(22) PCT Filed: May 31, 2012

(86) PCT No.: PCT/GB2012/051227
§ 371 (c)(1),
(2), (4) Date: Dec. 13, 2013

(87) PCT Pub. No.: WO2012/172308
PCT Pub. Date: Dec. 20, 2012

(65) Prior Publication Data
US 2014/0120422 A1 May 1, 2014

(30) Foreign Application Priority Data

Jun. 14, 2011 (EP) .................................. 11275095
Jun. 14, 2011 (GB) .................................. 1109928.0

(51) Int. Cl.
H01M 4/62 (2006.01)
H01M 4/04 (2006.01)
H01M 2/16 (2006.01)

(52) U.S. Cl.
CPC ............ *H01M 4/623* (2013.01); *H01M 2/16* (2013.01); *H01M 2/1606* (2013.01); *H01M 4/04* (2013.01); *Y10T 29/49108* (2015.01)

(58) Field of Classification Search
CPC ............ H01M 4/14; H01M 4/16; H01M 4/24; H01M 4/26; H01M 4/242; H01M 4/244;
(Continued)

(56) References Cited

U.S. PATENT DOCUMENTS 2,978,529 A * 4/1961 Brisley ............... H01M 2/1613
116/4
3,271,195 A 9/1966 Berchielli et al.
(Continued)

FOREIGN PATENT DOCUMENTS

EP 1063334 A1 12/2000
EP 1435673 A1 7/2004
(Continued)

OTHER PUBLICATIONS

International Search Report (PCT/ISA/210) dated Jul. 17, 2012, by the European Patent Office as the International Searching Authority for International Application No. PCT/GB2012/051227.
(Continued)

*Primary Examiner* — Ula C Ruddock
*Assistant Examiner* — Matthew W Van Oudenaren
(74) *Attorney, Agent, or Firm* — Maine Cernota & Rardin

(57) ABSTRACT

According to the invention there is provided a component including a rechargeable battery and a method of producing same. The component uses one of an acid and an alkaline chemistry and the battery has an anode structure, a cathode structure, and a separator structure which separates the anode from the cathode and contains an electrolyte. The anode structure and the cathode structure are each formed from a composite material which includes electrically conductive fibres and electrochemically active material in a binder matrix including less than 50% w/w of an elastomer binder and the battery is formed to be structurally inseparable from the rest of the component.

19 Claims, 2 Drawing Sheets

(58) Field of Classification Search
CPC ........ H01M 4/246; H01M 4/248; H01M 4/32;
H01M 4/34; H01M 10/24; H01M 10/26;
H01M 10/28; H01M 10/30; H01M 10/32;
H01M 10/345; H01M 10/347; H01M
10/342; H01M 10/34; H01M 4/62; H01M
4/622; H01M 4/623
See application file for complete search history.

(56) References Cited

U.S. PATENT DOCUMENTS

| | | | |
|---|---|---|---|
| 3,861,963 A | | 1/1975 | Afrance et al. |
| 5,180,645 A | | 1/1993 | More |
| 5,567,544 A | * | 10/1996 | Lyman ................ H01M 2/1083 29/623.4 |
| 5,584,893 A | * | 12/1996 | Mitchell ................ H01M 4/04 29/623.5 |
| 6,485,856 B1 | | 11/2002 | Brown et al. |
| 6,797,019 B2 | * | 9/2004 | Takeuchi ................ H01M 4/48 29/623.5 |
| 7,855,017 B1 | * | 12/2010 | Snyder .................... H01M 6/18 429/232 |
| 2002/0037455 A1 | * | 3/2002 | Tani ........................ H01M 4/30 429/223 |
| 2004/0241540 A1 | * | 12/2004 | Tsutsumi ................ H01M 2/16 429/122 |
| 2009/0087742 A1 | | 4/2009 | Martinet et al. |
| 2009/0136846 A1 | * | 5/2009 | Lee ..................... H01M 2/1653 429/217 |

FOREIGN PATENT DOCUMENTS

| | | |
|---|---|---|
| FR | 2684606 A1 | 6/1993 |
| GB | 1056345 | 1/1967 |
| WO | WO 92/16025 A1 | 9/1992 |
| WO | WO 92/21156 A1 | 11/1992 |
| WO | WO 2011/098793 A1 | 8/2011 |

OTHER PUBLICATIONS

European Search Report dated Nov. 28, 2011 for European Application No. 11275095.5.
Great Britain Search Report dated Aug. 17, 2011 for Great Britain Application No. GB1109928.0.

* cited by examiner

COMPONENT INCLUDING A
RECHARGEABLE BATTERY

This invention relates to rechargeable batteries, more specifically to rechargeable batteries, which have enhanced recharging capabilities and increased lifecycles. A well known example of a rechargeable battery is the lithium ion rechargeable battery, which is commonly used in consumer goods, and in the automotive and aerospace industries. Lithium ion rechargeable batteries offer a high energy density, which is a significant factor in their popularity.

The present inventors have realised in PCT/GB2011/050217 that acid and alkaline chemistries and in particular nickel-iron and nickel-zinc rechargeable alkaline batteries and certain related battery technologies have considerable attractions over seemingly, more mainstream Li-ion batteries. For example, nickel-zinc batteries require virtually no charging circuitry, and have a low internal resistance resulting in high charge/discharge rates. The theoretical energy density of acid and alkaline chemistry batteries is lower than lithium ion batteries, but in practice only a fraction of the theoretical value is achieved, using lithium ion, and nickel-zinc and other acid and alkaline chemistry batteries offer the possibility of high efficiencies in this regard. In order to encourage commercial use of nickel-zinc and other acid and alkaline chemistry rechargeable batteries it is desirable to provide structurally robust devices which are suited for 'real world' applications, and to enable convenient mass manufacture.

According to a first aspect of the invention there is provided a component including a rechargeable battery using one of an alkaline and acid based chemistry, the battery having an anode structure, a cathode structure and a separator structure which separates the anode from the cathode and contains an electrolyte, in which the anode structure and the cathode structure are each formed from a composite material which includes electrically conductive fibres and electrochemically active material in a binder matrix and wherein the battery is structurally inseparable from the rest of the component, characterised wherein the binder matrix comprises less than 50% w/w of an elastomer binder.

The use of 100% elastomer binder as the binder matrix provides a flexible structural panel, which may be desirable in clothing as disclosed in Applicant's PCT/GB2011/050217. One of the advantages of a structural battery, is the use as a direct replacement for a panel on a body, such as a structure, vehicle, vessel or craft. In this instance, a flexible panel is not required or desirable.

In a highly preferred arrangement the component, namely the rechargeable battery itself, is structurally rigid. It has been unexpectedly found that when the binder matrix comprises less than 50% w/w, typically in the range of 0.05% to 50%, more preferably in the range of from 1% to 50%, preferably 15% to 40% w/w and yet more preferably in the range of from 10% to 25% w/w, the inclusion of the elastomer binder provides an advantage of retaining a structurally rigid battery, with enhanced life-cycling properties, and greater energy storage. Energy densities for cells based on elastomer/binder matrices have been increased by a factor of over 20 compared with those which do not contain elastomer binders. Cell lifetimes have also been increased significantly over cells that possess porogens.

The use of porogens is known to provide increased energy density in structural composite batteries, however, excessive use of porogens may lead to degradation of the anode/cathode structures, via cracking and fatigue of the epoxy binders, during routine charging and discharging cycles. The binder matrices which do not contain elastomers may become debonded from the structures; during the charging cycles the volume of the active materials can vary considerably (nickel hydroxide, for example, changes volume by ~16% between its charged and discharged states) which can lead to cracking, especially in the region of the introduced holes(porogens). Any cracking or debonding may therefore decrease the lifetime of the cell- i.e. reduce the number of useful recharging cycles.

The elastomer binder must be inert to the chemistries present in the battery, such as, for example, highly acidic or basic conditions, depending on the specific chemistry type that is selected. The elastomer binder preferably has the ability to undergo hydrogen-bonding, so as to promote ion transport within the anode/cathode structures. One highly preferred species of elastomer binder is a fluorinated elastomer binder, yet more preferably a per- or poly-fluorinated elastomer binder, which are typically fluoropolymers, such as, for example Viton®.

The use of fluorinated elastomers as the elastomer binder, provides the elastomeric properties to the cured anode/cathode structure, i.e. to prevent cracking and debonding. A further advantage is the ability to support ion transport, via the hydrogen bonded backbone in the fluoropolymer.

The fluorinated elastomer during mixing with a suitable binder, provides ribbon like strands of the fluorinated elastomer, thus providing pathways in the anode/cathode structures to promote the flow of ions.

Thus it is possible to provide a component comprising a 'structural' rechargeable battery, with enhanced cycling properties in which fibre reinforced cell components provide a dual role by functioning as active electrochemical or electrical elements and also as structural features of the component, being integral therewith. The battery may thus be entirely free of any border or barrier between the cell or cells of the battery and any part of the component which does not act as part of the battery. Thus, parts of the component which are not part of the battery may simply comprise composite material where the fibres or matrix are not electrically conductive or electrochemically active.

This provides advantageous mechanical properties and/or component performance properties. For example, conventional batteries require additional support structures, such as casing, packaging, separators, electrodes, current collectors and the like. These, from a component operational point of view, are wholly parasitic. The present inventors have recognised that these additional support structures reduce the volumetric and/or gravimetric efficiency of conventional batteries. In the present invention, active electrochemical and electrical components are multi-functional since they also perform a structural role as, for example, load bearing, protective or otherwise physically robust elements of the component.

Preferably, the separator structure is formed from a composite material which includes electrically insulating fibres in a binder matrix, optionally the binder matrix in the separator layer may comprise a portion of elastomer binder, preferably fluorinated elastomer binder. The electrically insulating fibres may be glass, polymer, ceramic or textile fibres, and may be selected depending on the desired mechanical or physical properties of the component. Examples of suitable electrically insulating fibres include E-glass fabric, and silicon carbide fibres. Examples of textile fibres include natural fibres such as cotton, and synthetic fibres which are typically polymer fibres such as nylon® and polyester.

In one preferred embodiment, the rechargeable battery is a nickel-zinc rechargeable battery. The skilled reader will appreciate that in such embodiments, the electrochemically active materials may be nickel hydroxide and zinc oxide.

Alternatively, the rechargeable battery may be a nickel-iron, nickel-cadmium, nickel metal hydride or silver-zinc rechargeable battery.

In a further embodiment, one or more of the anode structure, cathode structure and the separator structure may contain a porous additive (i.e. a porogen) which increases access of the electrolyte into said structure. The porous additive may be one or more of a silica, a silica gel or carbon powder.

At least one of the anode structure and the cathode structure may further include an electrically conductive additive such as carbon powder. It will be apparent to the skilled reader that carbon powder can perform a dual role as a porous additive and an electrically conductive additive.

At least one of the anode structure and the cathode structure may further include an ion conducting additive such as polyethylene oxide (PEO).

When an aqueous electrolyte is employed, it is conveniently removed for electrolyte replacement or battery storage purposes. Aqueous electrolyte may be accommodated by partially bonding the separator structure to the anode structure and/or cathode structure to provide interstices. Alternatively, a porous additive as mentioned above may be used to provide a more open cell structure having channels for the electrolyte to promote circulation of the electrolyte around the electrically active materials of the anode and cathode.

Alternatively, the electrolyte may be a gel.

Further in the alternative, the electrolyte may be a solid polymer electrolyte (SPE). The SPE may include polyvinyl alcohol (PVA), polyethylene oxide (PEO), polyacrylic acid (PAA) or grafted analogues or combinations thereof. Biphasic mixtures of SPE's may be used. Additives may be present in the SPE to modify its electrical, physical or chemical properties.

According to a further aspect of the invention there is provided a structural composite energy storage device comprising
a first electrode structure,
a second electrode structure,
a separator structure which separates the first and second electrodes respectively, wherein said device is capable of in use containing an electrolyte in a binder matrix, characterised wherein the binder matrix comprises less than 50% w/w of an elastomer binder. The elastomeric binder may be used in any composite electrical energy storage device, such as, for example composite batteries, supercapacitors and thermoelectric devices.

According to a further aspect of the invention there is provided a panel on a vehicle vessel or craft comprising at least one component according to the invention.

Advantageously, the electrically conductive fibres of the anode and cathode structures are carbon or metal fibres. Carbon fibres in particular will enable components of the invention to be used where they are required to be strong and light such as in structural applications for aircraft or satellites. A particular application is seen as providing both structure and power in unmanned aerial vehicles which are often required to stay in flight for long periods, for example when carrying out surveillance operations, and where a source of power which does not add significantly to the weight of the aircraft will enable the aircraft to stay in flight for longer than if conventional batteries were used. Batteries used in this way will work well with solar cells, positioned say on the aircraft wings, which can be used to re-charge the cells in flight. Components according to the invention, may be used for example as wing skins, can be used to provide power for structural health monitoring of the aircraft when in flight. The availability of such power, with low additional weight, may enable longer flights to be planned in the knowledge that any aircraft health issues which arise are likely to be notified early and may be provided with more sophistication that was previously possible because more monitoring systems can be provided for the same weight, when compared with conventional batteries. Thus, more accurate decision making about the flightworthiness of the aircraft is likely to lead to greater mission availability.

The electrically conductive fibres of the anode and cathode structures may include fibres having a conductive coating. The fibres having a conductive coating may include carbon fibres and/or electrically insulating fibres. Examples of electrically insulating fibres include glass fibres, polymer fibres, ceramic fibres such as silicon carbide fibres, and textile fibres. Examples of textile fibres include natural fibres such as cotton and synthetic fibres which are typically polymer fibres such as nylon® and polyester.

Preferably, where the electrically conductive fibres of the anode and cathode structures include fibres having a conductive coating, these fibres are metallised fibres, such as nickel coated fibres. However, other conductive coatings might be utilised.

The electrically conductive fibres of the anode and cathode structures may be in the form of a woven fabric or may be non woven, for example in a non crimp fabric.

Alternatively, the electrically insulating binder matrix material may include or consist of an open cell foam, a geopolymer or an SPE. In the latter case, the SPE may perform a dual role as both binder and electrolyte.

The rechargeable battery may include a number [plurality] of cells which may be interdigitated, multilayered or spatially distributed within the component or article. For example, an aircraft composite wing skin incorporating cells, according to the invention, may have the cells distributed across a large area of wing, either because the cells are connectable to solar cells distributed on the wing skin or because the cells are connectible to distributed power users such as lights, flight control surfaces, valves or sensors for aircraft systems, etc., located in different parts of the wing.

The thickness of the anode structure, cathode structure and/or the separator structure may be conveniently varied in order to provide desired mechanical and electrical properties. These structures may be formed from one or more layers. Variation of the number of layers is one way in which the thickness of these structures may be varied The separator structure may include separator materials such as microporous polymer films, which may be used instead of or in combination with electrically insulating fibres in a binder matrix to aid ion transport.

According to a further aspect of the invention there is provided a method of manufacturing a component including, and being structurally inseparable from, a rechargeable battery using one of an acid and alkaline based chemistry, the rechargeable battery including an anode structure and a cathode structure comprising fibrous reinforcing material and plastics matrix material and a separator structure, the separator structure separating the anode from the cathode and being adapted to contain an electrolyte; the method including the steps of laying up, either side of the separator structure, a layup of plies of electrically conductive fibrous reinforcing material for the anode structure and the cathode structure, introducing a binder matrix, comprising less than 50% w/w of an elastomer binder, into at least the anode and the cathode structures and consolidating the layup of cathode, anode and separator into a single composite component.

A composite component according to the invention may conveniently be made by any known composite manufacturing processes compatible with the cell chemistry concerned. For example, wet layup; pre-pregging; resin infusion or resin transfer moulding or vacuum assisted resin transfer moulding may all be used. Use of such well known techniques allows great flexibility in form and size of batteries incorporated into components made according to the invention. One advantage of using these commonly used techniques is that components of the invention may be employed to replace already existing parts made by the same techniques but not having the advantage of a battery formed integral therewith.

Components according to the invention may be used in new designs or to replace worn, damaged or outdated parts of any items which can be manufactured of composite material. For example, vehicles, whether land, air, space or water born, may have parts manufactured with integral cells, according to the invention. Examples of such use may include wing skins on aircraft, and in particular unmanned air vehicles, where components according to the invention may be used to power structural monitoring equipment, control surfaces, cameras, lights etc. Where the component may be exposed to sunlight or be otherwise connectible to photovoltaic equipment, the cell or cells may be charged using such equipment. Owing to the ability of cells in composite components according to the invention to be positioned anywhere in the component, where the component is a wing skin the photovoltaic cells may be positioned adjacent the cells of the invention to avoid unnecessary wiring. Conveniently, where the component is used to replace a panel on an existing body, vehicle, vessel or craft, the component may preferably be engineered to the same dimensions as the original panel.

Further potential uses on vehicles may include body panels on hybrid or electric drive vehicles where the components of the invention can be used to save weight and bulk, compared to conventional batteries. Such components may also find use on free flooding hydrodynamic hulls of, say, submersible remotely operated vehicles. The components would be especially useful on any vehicle where weight or bulk was at a premium like an aircraft or a satellite. On a satellite the saving in space and bulk of components according to the invention which could be used to power various systems would potentially be of great benefit and would likely increase the payload capability of the satellite substantially.

In buildings, components according to the invention may comprise wall panels in portable or temporary buildings, room dividers, suspended ceiling panels, doors or window frames. In all these items the electrical power available from the battery would replace or reduce the need for wiring and, once again, the cells could be used in conjunction with photovoltaic equipment to generate the power held in the cells of the components according to the invention.

A further advantage of using cells incorporated into such components is that the mass of the battery or batteries, where desired, may be distributed integrally throughout the various components. This can be very beneficial, for example, when sudden shocks occur to the component. Such shocks might occur, for example, for vehicles involved in collisions. For military or, say, nuclear containment equipment, explosions or projectile impacts may cause such shocks. Under such conditions the integral nature of the batteries in the components of which they form part will prevent their tending to act as uncontained missiles. Conventional batteries, when used in military tanks or armoured carriers for example, will be liable to act as uncontained missiles during an explosion or under projectile impact. However, batteries integral with the components according to the invention, because of the inherent support for the cells provided by the structure of the component, will not form separate detached objects and will avoid this problem.

An example of a component according to the invention in which rechargeable batteries are evenly distributed is internal panelling for a vehicle which may be in the form of a spall liner, as used in military vehicles. These vehicles are often used for reconnaissance patrols during which they spend a considerable time with their engines switched off on 'silent watch'. In these circumstances the batteries may be used to provide power for sensors, communications, life support, air conditioning, etc. and there must be enough residual battery power to restart the vehicle engine. The spall liners will form part of the vehicle armour but will also provide additional power without taking up any further limited internal space and will not add further weight or bulk to the vehicle. The extra weight of additional conventional batteries would normally reduce manoeuvrability and speed of the vehicle. Components according to the invention may also comprise external vehicle armour as this is often manufactured from composite material.

The distributed nature of the batteries in the components also has the advantage of easing the design of an aircraft for the correct weight distribution. There is no parasitic mass which has to be positioned wherever space is available on the aircraft and which forms a concentrated mass which must be balanced in order to trim the aircraft and which must be wired to equipment to be powered and also to a power source. The weight of supports and packaging for the batteries will also be avoided as they will be integral with the aircraft itself. The batteries may be positioned closer to equipment to be powered as they form part of the aircraft structure and do not need separate accommodation. Thus, for example cabin interior lights may use a battery supply from cells comprising cabin panelling in which the lighting is mounted and wing lights or systems equipment may be supplied by power from batteries according to the invention comprising part of the wing structure. Instruments in the cockpit may be powered by batteries, according to the invention, comprising the instrument panel itself.

Of potential great importance would be the use of components according to the invention in electrical or electronic equipment, in particular portable equipment such as computers, personal digital assistants (PDAs), cameras and telephones. Here mountings for such equipment such as circuit boards, casings and the like could be made according to the invention which would, again, assist in cutting down the weight and bulk of such items enabling them to be lighter, smaller and possibly cheaper, owing to the reduced part count. Alternatively, for equipment carried on the user's person such as cameras, PDAs and mobile phones, the power source for such equipment could be comprised in items of clothing to be worn by the user. In addition, the perennial problem of heat dissipation in portable equipment powered by batteries could be alleviated by incorporating the cells in, for example, the casing of a portable computer where they could dissipate heat much more easily with the possible avoidance of the need for cooling fans.

For energy capture, components such as wind turbine casings or blades and solar array support structures could be made according to the invention to cut down on wiring or on weight and bulk.

When building structures are fabricated from such batteries they may in addition be provided with solar panels, or other energy generation means, so as to provide a readily portable structure comprising both energy generation and energy storage means.

Whilst the invention has been described above, it extends to any inventive combination of the features set out above, or in the following description, drawings or claims.

Exemplary embodiments of the component in accordance with the invention will now be described with reference to the accompanying drawings in which.

Figure 1:
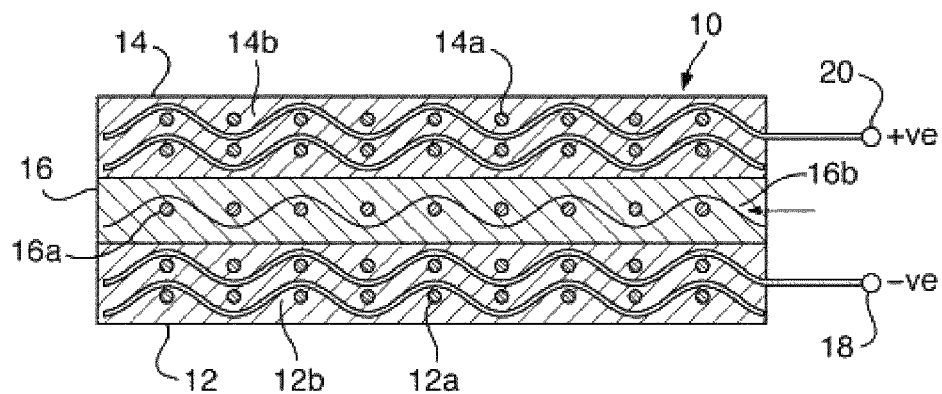
FIG. 1 shows a cross sectional side view of a component integral with a nickel-zinc rechargeable electrochemical cell, according to the invention.

The invention provides components comprising rechargeable batteries using one of an acid or an alkaline chemistry and formed at least in part from composite materials, thereby imparting desired structural properties. FIG. 1 shows an example of a component integral with an alkaline rechargeable battery of the invention, depicted generally at 10, comprising an anode structure 12 which is spaced apart from a cathode structure 14 by a separator structure 16. The anode and cathode structures 12, 14 may be connected to suitable electrode contacts 18, 20 to permit charging and discharging of the cell in the usual manner, although, as explained in more detail below, the anode and cathode structures 12, 14 may act fully as current collectors.

Each of the anode and cathode structures 12, 14 and the separator structure 16 are formed as a composite material comprising suitable fibres in a binder matrix, comprising less than 50% fluorinated elastomer binder 12b,14b. The anode and cathode structures 12, 14 comprise electrically conductive fibres 12a, 14a in respective binder matrices 12b, 14b. The separator structure 16 comprises electrically insulating fibres 16a in a binder matrix, optionally comprising less than 50% fluorinated elastomer binder 16b.

A representative example of a component of the invention integral with an alkaline battery in the form of a nickel-zinc battery will now be described, in which epoxy resin, with 25% fluorinated elastomer binder is used as the binder matrix throughout the device. The anode structure 12 is formed from a plain weave carbon fibre fabric 12a embedded in the binder matrix 12b. The binder matrix 12b also contains porous carbon powder and nickel hydroxide (Ni(OH)$_2$) powder, all of which is mixed thoroughly prior to use. The carbon fibre fabric forms a convenient current collector.

The cathode structure 14 is formed from a plain weave carbon fibre fabric 14a embedded in the binder matrix 14b. The binder matrix 14b also contains porous carbon powder and zinc oxide (ZnO) powder, all of which is mixed thoroughly prior to use. Typically, the number of moles of zinc oxide used is approximately half that of the nickel hydroxide, in view of the stoichiometry of the electrochemical reaction. The electrochemistry of the nickel zinc battery will be well known to the skilled reader, and therefore further details are not provided herein. The carbon fibre fabric forms a convenient current collector.

The active additives in the anode and cathode structures (the nickel hydroxide, zinc oxide and carbon powder) are typically present as fine powders having particle sizes in the range 1 to 10 µm.

The separator structure 16 is formed from a plain weave E-glass fabric 16a embedded in the binder matrix 16b. Other electrically insulating fibres such as silicon carbide which provide suitable structural reinforcement might be used instead. Other separators such as microporous polymer films may be used either alone or in combination with the glass fabric. The separator structure 16 contains an aqueous electrolyte consisting of 40% by weight potassium hydroxide in deionised water. Zinc oxide is dissolved in this solution until saturation or near saturation is achieved.

The electrolyte can be accommodated in a number of ways. The separator structure may be partially bonded in order to provide spaces which can be filled by the electrolyte. The electrolyte is retained by capillary action between fibres. A 30 to 40% degree of bonding is suitable for this purpose. A porous additive, such as a silica or a silica gel, may be used to provide a more open cell structure or a microporous polymer film may be employed. Vents may be provided to control the release of gases during overcharge conditions and fill/drain ports may be fitted to permit the introduction and removal of the aqueous electrolyte for maintenance or storage.

The component of the invention can be manufactured in different ways. For example, it is possible to fully manufacture each of the anode and cathode structures and the separator structure separately and subsequently bond these completed structures together. Alternatively, each structure may be produced separately, but with partial cure of the binder matrices, so that the structures can be co-cured together. The entire structure of the anode, cathode and separator structures may be formed with a common binder matrix, for example in a wet lay up process, to provide a 'monolithic' structure for the component.

Where silica, or a silica gel is used to provide an open cell structure in the separator layer, the separator may be presoaked in electrolyte prior to introduction of the epoxy binder so that the epoxy does not penetrate into the open cells.

There are numerous variations on the embodiment shown in FIG. 1. Other alkaline batteries such as nickel-iron, nickel-cadmium, nickel metal hydride (NiMH) and silver-zinc might be produced in accordance with the invention. Alternatively, a lead acid battery could be used with lead oxide being used as the active material in the cathode and lead in the anode with sulphuric acid acting as the electrolyte.

Figure 2:
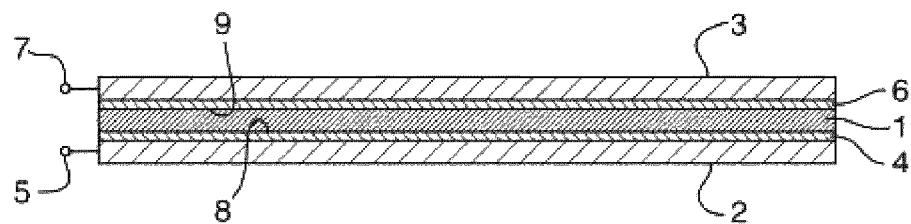
FIG. 2 shows a cross sectional side view of a component integral with a rechargeable electrochemical cell according to the invention and suitable for use with alternative cell chemistries.

Alternative cell chemistries are now described in conjunction with FIG. 2. Here, in an arrangement similar to that shown in FIG. 1, the structure of a component in accordance with the invention is shown in section in the form of a basic structural cell. A separator 1, containing electrolyte is shown sandwiched between an anode 2 and a cathode 3. The anode comprises active material 4 and a current collector 5 and the cathode 3 comprises active material 6 and a current collector 7. Table 1, below, shows alternative chemistries for the positive active material, the negative active material and the electrolyte. Active material may be intimately mixed with current collector binder comprising elastomer binder according to the invention, eg. epoxy resin/Viton®, and/or applied as a surface coating on the inner faces 8, 9 adjacent the separator. Choice of active materials and electrolyte set the cell chemistry; chemistry substitution is simply a matter of blending the appropriate electrically active materials.

TABLE 1

| Cell type | +ve active material | −ve active material | Electrolyte |
|---|---|---|---|
| Nickel-zinc | Nickel hydroxide | Zinc oxide | 40% KOH solution (aqueous) |
| Nickel-iron | Nickel hydroxide | Iron oxide | 40% KOH solution (aqueous) |
| Lead-acid | Lead oxide | Lead | 4.2M Sulphuric acid (aqueous) |

Features and techniques which are known in the art of alkaline rechargeable batteries may be used in conjunction with the present invention. For example, nickel-zinc battery technology developed by PowerGenix Corp, of San Diego, Calif. 92131-1109, USA may be incorporated into the present invention.

Other electrolyte systems may be used. For example, a porous separator structure may be produced by using a geopolymer or an open cell foam. A gel electrolyte may be produced by adding gelling agents to an aqueous electrolyte solution. In an alternative approach, a solid polymer electrolyte (SPE) or a SPE blend may be used in the separator structure, for example to act as a binder and an electrolyte. The SPE or SPE blend may also bind the anode and the cathode structures, or at least bind the anode and cathode structures to the separator structure. Where the SPE is used as the binder for the anode and cathode it will comprise less than 50% w/w of a fluorinated elastomer. This will increase the access of the electrolyte into the anode and cathode structures. Multiphase electrolytes, comprising SPE blended with a mechanically stiff matrix material can also be used. For example, SPE materials such as polyethylene oxide (PEO) and polyvinyl alcohol (PVA) can be used. Suitable mechanically-stiff matrix materials for blending include epoxies, polyesters, or polyimides.

The anode, cathode and separator structures are not necessarily planar. Non-planar configurations may be employed, for example, to provide a curved or even a generally tubular battery structure. The composite structures of the invention are well suited for such configurations. The battery may comprise a number of electrodes and secondary electrochemical cells, each cell comprising anode, cathode and separator structures.

Figure 3:
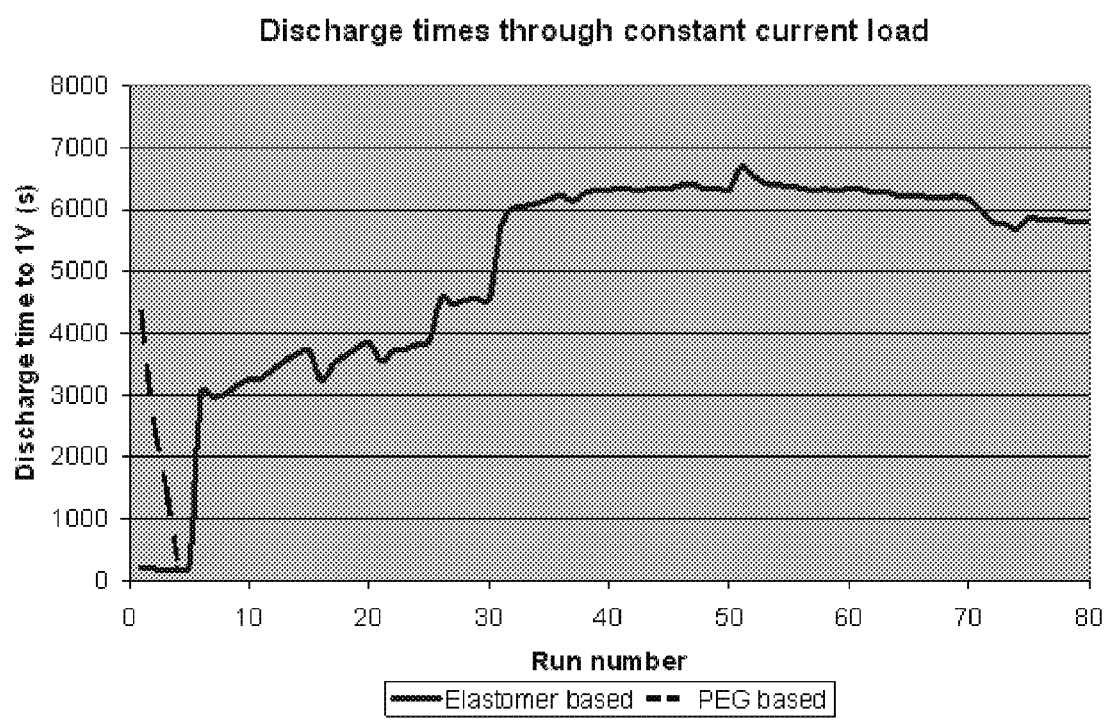
FIG. 3 shows a graph of discharge times against successive numbers of cycling steps (run number)

FIG. 3. shows a graph of the discharging time of the cell down to 1 volt over progressive run numbers(cycles). The polyethylene glycol (PEG) only based cell capacity (dotted line) dropped to 7% of its initial time to discharge value after only 4 charge/discharge cycles. That is to say that the battery failed to retain its charge under constant load, after only 4 cycles. Whereas the cell containing Viton® at 25% w/w (fluorinated elastomer binder), after 20-30 burn-in cycles the cell maintained its integrity for greater than 150 cycles with little appreciable loss of capacity (only the first 80 cycles are shown on the graph for clarity).

TABLE 2

| Cell type | Typical Energy Density (Wh/kg) |
|---|---|
| Epoxy binder | 0.25 |
| PEG porogen in epoxy binder | 2.5 |
| Fluorinated elastomer/epoxy blend | 6.0 |

Table 2, above shows typical improvements in energy density through the use of a fluorinated elastomer binder, in the binder matrix. The fluorinated elastomer binder in Table 2 is the same as shown in the graph in FIG. 3, Viton® present at 25% w/w of the binder matrix. Table 2, above, shows that the use of fluorinated elastomer provides increased energy density over standard epoxy binder based composite battery cells.

The invention claimed is:

1. A substantially rigid structural component comprising:
a rechargeable, rigid, structural battery using one of an alkaline and acid based chemistry, the battery having a rigid anode structure, a rigid cathode structure and a rigid separator structure which separates the anode structure from the cathode structure and contains an electrolyte, wherein:
the anode structure and the cathode structure are each formed from a composite material which includes electrically conductive fibres and electrochemically active material in a cured binder matrix, and the separator structure is formed from a composite material which includes electrically insulating fibres in the cured binder matrix, so that the anode, cathode and separator provide a monolithic structure;
the battery is structurally inseparable from a remainder of the substantially rigid structural component; and
the binder matrix contains in a range of from 0.05% to 50% w/w of an elastomer binder.

2. The component according to claim 1, wherein the anode and cathode binder matrices contain in a range of from 15% to 40% w/w of the elastomer binder.

3. The component according to claim 1, wherein the elastomer binder is present in the anode and cathode binder matrices in a range of from 10 to 25% w/w.

4. The component according to claim 1, wherein the elastomer binder is a fluorinated elastomer binder.

5. The component according to claim 4, wherein the elastomer binder is a per-fluorinated or poly-fluorinated elastomer binder.

6. The component according to claim 1, comprising a battery using an aqueous liquid or gel electrolyte.

7. The component according to claim 1, comprising a nickel-zinc, nickel-iron, nickel-cadmium, nickel metal hydride, lead acid or silver-zinc rechargeable battery.

8. The component according to claim 1 in which one or more of the anode structure, the cathode structure and the separator structure comprises a porous additive which increases access of the electrolyte into said structure.

9. The component according to claim 1 in which at least one of the anode structure and the cathode structure comprises an electrically conductive additive.

10. The component according to claim 1, in which the electrically conductive fibres of the anode and cathode structures are formed as a woven fabric.

11. The component according to claim 1, in which at least one of the anode structure, the cathode structure and the separator structure is formed from a composite material which comprises an electrically insulating polymer, ceramic, or glass based binder matrix.

12. A panel on a vehicle vessel or craft comprising: at least one component according to claim 1.

13. A method of manufacturing a substantially rigid structural component including, and being structurally inseparable from, a rechargeable, rigid, structural battery using one of an acid and alkaline based chemistry, the rechargeable battery including a rigid anode structure and a rigid cathode structure containing fibrous reinforcing material and binder matrix material, and a rigid separator structure formed from a composite material which includes electrically insulating fibres in the cured binder matrix, the separator structure separating the anode structure from the cathode structure and being adapted to contain an electrolyte, the anode structure, cathode structure, and separator structure forming a monolithic structure, the method comprising:

laying up, on either side of the separator structure, a layup of plies of electrically conductive fibrous reinforcing material for the anode structure and the cathode structure;

introducing a curable binder matrix, containing in the range of from 0.05% to 50% w/w of an elastomer binder, into at least the anode and the cathode structures; and curing the layup of cathode, anode and separator structures into a single composite substantially rigid structural component.

14. The component according to claim 2, wherein the elastomer binder is a fluorinated elastomer binder.

15. The component according to claim 14, wherein the separator structure is formed from a composite material which includes electrically insulating fibres in a binder matrix.

16. The component according to claim 15, comprising a battery using an aqueous liquid or gel electrolyte.

17. The component according to claim 16, comprising a nickel-zinc, nickel-iron, nickel-cadmium, nickel metal hydride, lead acid, or silver-zinc rechargeable battery.

18. The component according to claim 17 in which one or more of the anode structure, the cathode structure and the separator structure comprises a porous additive which increases access of the electrolyte into said structure.

19. The component according to claim 1, wherein the electrically conductive fibres of the anode and cathode structures are arranged in fibre plies.

* * * * *